United States Patent
Bach

(10) Patent No.: US 10,340,732 B2
(45) Date of Patent: Jul. 2, 2019

(54) AUTOMATIC UPS BYPASS LOAD SHARING

(71) Applicant: SCHNEIDER ELECTRIC IT CORPORATION, West Kingston, RI (US)

(72) Inventor: Lars Nørup Bach, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 407 days.

(21) Appl. No.: 14/959,056

(22) Filed: Dec. 4, 2015

(65) Prior Publication Data
US 2017/0163086 A1 Jun. 8, 2017

(51) Int. Cl.
 *H02J 9/06* (2006.01)
 *H02M 7/04* (2006.01)
 *H02M 7/42* (2006.01)

(52) U.S. Cl.
 CPC ............ *H02J 9/061* (2013.01); *H02M 7/04* (2013.01); *H02M 7/42* (2013.01)

(58) Field of Classification Search
 CPC .... H02J 9/06; H02J 9/061; H02J 3/14; H02M 7/04; H02M 7/043; H02M 7/046; H02M 7/06; H02M 7/062; H02M 7/064; H02M 7/066; H02M 7/068; H02M 7/08; H02M 7/02; H02M 7/10–21
 USPC .......................................................... 307/64
 See application file for complete search history.

(56) References Cited

U.S. PATENT DOCUMENTS

| | | | |
|---|---|---|---|
| 9,831,675 B2 | 11/2017 | Colombi et al. | |
| 10,003,189 B2 | 6/2018 | Ouyang | |
| 2005/0288826 A1 | 12/2005 | Tassitino et al. | |
| 2011/0278931 A1* | 11/2011 | Johnson, Jr. | H02J 3/26 307/66 |
| 2011/0278934 A1 | 11/2011 | Ghosh et al. | |
| 2012/0181871 A1* | 7/2012 | Johansen | H02J 9/062 307/66 |

(Continued)

FOREIGN PATENT DOCUMENTS

WO 2014193385 A2 12/2014

OTHER PUBLICATIONS

Notification of Transmittal of the International Search Report and the Written Opinion of the International Searching Authority from corresponding PCT/US2016/064343 dated Apr. 18, 2017.

(Continued)

*Primary Examiner* — Patrick C Chen
(74) *Attorney, Agent, or Firm* — Lando & Anastasi, LLP

(57) ABSTRACT

According to one aspect, embodiments herein provide a UPS system comprising: a plurality of UPS's configured to be coupled in parallel, each UPS comprising: a bypass line selectively coupled between an input and an output via a bypass switch, wherein the bypass switch is configured to close in a first mode and to open in a second mode, and a controller coupled to the plurality of UPS's and configured to, in response to a determination that input power is at a desired level, control the bypass switch of a first UPS in the plurality of UPS's to operate in the first mode and provide a continuous output current waveform with an RMS value to the load, and selectively control the bypass switch of each other UPS to operate in the first mode such that an output current waveform provided by each UPS includes at least one delay period.

21 Claims, 5 Drawing Sheets

(56) References Cited

U.S. PATENT DOCUMENTS

| | | | |
|---|---|---|---|
| 2013/0193759 A1* | 8/2013 | Giuntini | H02J 9/061 307/64 |
| 2013/0193760 A1 | 8/2013 | Colombi et al. | |
| 2013/0193761 A1 | 8/2013 | Colombi et al. | |
| 2015/0061392 A1* | 3/2015 | Berard | G01R 31/42 307/52 |
| 2015/0263566 A1 | 9/2015 | Kolhatkar et al. | |
| 2016/0308389 A1* | 10/2016 | Bush | H02J 3/46 |
| 2017/0163086 A1 | 6/2017 | Bach | |
| 2017/0250604 A1 | 8/2017 | Ouyang | |
| 2018/0301930 A1* | 10/2018 | Gonzalez | H02J 7/007 |

OTHER PUBLICATIONS

Extended European Search Report from corresponding European Application No. 16871472.3 dated May 2, 2019.

* cited by examiner

AUTOMATIC UPS BYPASS LOAD SHARING

BACKGROUND OF INVENTION

1. Field of Invention

At least some embodiments described herein relate generally to Uninterruptible Power Supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

To provide enhanced scalability and/or redundancy, two or more UPS's may be electrically connected to form a single parallel UPS system with one output. In such a system, the combination of multiple UPS's may provide increased power capacity to a load attached to the parallel UPS system. Also, if one of the UPS's coupled in parallel fails, the other UPS's coupled in parallel may backup for the failed UPS.

SUMMARY

At least one aspect of the invention is directed to an Uninterruptible Power Supply (UPS) system comprising: a plurality of Uninterruptible Power Supplies (UPS) configured to be coupled in parallel, each UPS comprising: an input configured to be coupled to a power source and to receive input power, an output configured to be coupled to a load and to provide output power to the load derived from at least the input power, and a bypass line selectively coupled between the input and the output via a bypass switch, wherein the bypass switch is configured to close in a first mode of operation, coupling the input of the UPS to the output of the UPS via the bypass line, and to open in a second mode of operation, decoupling the input of the UPS from the output of the UPS, and a controller coupled to the plurality of UPS's and configured to monitor the input power received at the input of each UPS, in response to a determination that the input power is at a desired level, control the bypass switch of a first UPS in the plurality of UPS's to operate in the first mode of operation and provide a continuous output current waveform with a Root Mean Square (RMS) value to the load, and in response to the determination that the input power is at the desired level, selectively control the bypass switch of each other UPS in the plurality of UPS's to operate in the first mode of operation such that an output current waveform provided by each UPS to the load includes at least one delay period.

According to one embodiment, in selectively controlling the bypass switch of each other UPS in the plurality of UPS's to operate in the first mode of operation, the controller is further configured to selectively control the bypass switch of each other UPS in the plurality of UPS's to operate in the first mode of operation such that the output current waveform provided by each UPS to the load has an RMS value substantially the same as the RMS value of the continuous output current waveform. In another embodiment, in selectively controlling the bypass switch of each other UPS in the plurality of UPS's to operate in the first mode of operation, the controller is further configured to control the bypass switch of a second UPS in the plurality of UPS's to operate in the first mode of operation such that a first output current waveform is provided to the load, the first output current waveform including at least one first delay period and having an RMS value substantially the same as the RMS value of the continuous output current waveform, and control the bypass switch of a third UPS in the plurality of UPS's to operate in the first mode of operation such that a second output current waveform is provided to the load, the second output current waveform including at least one second delay period and having an RMS value substantially the same as the RMS value of the continuous output current waveform.

According to one embodiment, the bypass switch within each UPS includes a Silicon Controlled Rectifier (SCR). In another embodiment, the system is configured such that the RMS value of the continuous output current waveform, the RMS value of the first output current waveform, and the RMS value of the second output current waveform differ by less than 0.1%. In one embodiment, the controller is further configured to control the bypass switch of the second UPS such that the at least one first delay period occurs in the first output current waveform at each zero crossing of the first output current waveform, and wherein the controller is further configured to control the bypass switch of the third UPS such that the at least one second delay period occurs in the second output current waveform at each zero crossing of the second output current waveform. In another embodiment, the controller is further configured to: monitor a quality of the continuous output current waveform, and in response to determining that the continuous output current waveform is not sinusoidal, reduce the first delay period.

According to another embodiment, the controller is further configured to update a value of the at least one first delay period and a value of the at least one second delay period each time the controller controls the first UPS to operate in the first mode of operation. In one embodiment, the controller is further configured to periodically update a value of the at least one first delay period and a value of the at least one second delay period.

According to one embodiment, each UPS in the plurality of UPS's further comprises an AC/DC converter coupled to the input and configured to convert the input power into DC power, a DC bus coupled to the AC/DC converter and configured to receive the DC power, and a DC/AC inverter coupled to the DC bus, wherein in response to a determination that the input power is above or below the desired level, the controller is further configured to control the bypass switch of each UPS in the plurality of UPS's to operate in the second mode of operation and to operate the DC/AC inverter of each UPS to convert the DC power on the DC bus into the output power. In one embodiment, each UPS in the plurality of UPS's further comprises a battery coupled to the DC bus and configured to provide battery power to the DC bus, wherein in response to a determination that the input power has failed, the controller is further configured to control the bypass switch of each UPS in the plurality of UPS's to operate in the second mode of operation and to operate the DC/AC inverter of each UPS to convert the battery power on the DC bus into the output power.

According to another embodiment, the controller is further configured to in response to the determination that the input power is at the desired level, control the bypass switch of each UPS in the plurality of UPS's to operate in the first mode of operation such that each UPS in the plurality of UPS's provides a continuous output current waveform having an RMS value to the load, monitor the continuous output current waveform of each UPS in the plurality of UPS's, and identify the first UPS of the plurality of UPS's based on a determination of which continuous output current waveform has the lowest RMS value.

Another aspect of the invention is directed to a method for operating a UPS system including a plurality of UPS's coupled in parallel, each UPS comprising an input configured to receive input power, an output configured to provide output power to a load, and a bypass line selectively coupled between the input and the output via a bypass switch, the method comprising monitoring the input power received at the input of each UPS, in response to a determination that the input power is at a desired level, controlling, in a bypass mode of operation, the bypass switch of a first UPS in the plurality of UPS's to couple the input of the first UPS to the output of the first UPS via the bypass line such that the first UPS provides a continuous output current waveform with an RMS value to the load, and in response to the determination that the input power is at the desired level, selectively controlling, for each other UPS in the plurality of UPS's, the bypass switch to couple the input to the output via the bypass line such that an output current waveform provided by each UPS to the load includes at least one delay period.

According to one embodiment, selectively controlling includes, for each other UPS in the plurality of UPS's, the bypass switch to couple the input to the output via the bypass line such that the output current waveform provided by each UPS to the load has an RMS value substantially the same as the RMS value of the continuous output current waveform. In one embodiment, selectively controlling further includes controlling the bypass switch of a second UPS in the plurality of UPS's to couple the input to the output such that a first output current waveform is provided to the load, the first output current waveform including at least one first delay period and having an RMS value substantially the same as the RMS value of the continuous output current waveform, and controlling the bypass switch of a third UPS in the plurality of UPS's to couple the input to the output such that a second output current waveform is provided to the load, the second output current waveform including at least one second delay period and having an RMS value substantially the same as the RMS value of the continuous output current waveform.

According to another embodiment, controlling the bypass switch of the second UPS includes controlling the bypass switch of the second UPS such that the at least one first delay period occurs in the first output current waveform at each zero crossing of the first output current waveform and controlling the bypass switch of the third UPS includes controlling the bypass switch of the third UPS such that the at least one second delay period occurs in the second output current waveform at each zero crossing of the second output current waveform. In one embodiment, the method further comprises monitoring a quality of the continuous output current waveform, and in response to determining that the continuous output current waveform is not sinusoidal, reducing the at least one first delay period. In another embodiment, the method further comprises at least one of updating the at least one first delay period and the at least one second delay period each time the bypass switch of the first UPS is operated in the bypass mode, and periodically updating the at least one first delay period and the at least one second delay period.

According to one embodiment, the method further comprises in response to the determination that the input power is at the desired level, controlling the bypass switch of each UPS in the plurality of UPS's to operate in the first mode of operation such that each UPS in the plurality of UPS's provides a continuous output current waveform having an RMS value to the load, monitoring the continuous output current waveform of each UPS in the plurality of UPS's, and identifying the first UPS of the plurality of UPS's based on a determination of which continuous output current waveform has the lowest RMS value.

At least one aspect of the invention is directed to an Uninterruptible Power Supply (UPS) system comprising a plurality of Uninterruptible Power Supplies (UPS) configured to be coupled in parallel, each UPS comprising an input configured to be coupled to a power source and to receive input power, an output configured to be coupled to a load and to provide output power to the load derived from at least the input power, and a bypass line selectively coupled between the input and the output via a bypass switch, wherein the bypass switch is configured to close in a bypass mode of operation, coupling the input of the UPS to the output of the UPS via the bypass line, and means for operating each UPS in the bypass mode of operation in response to determining that the input power is at a desired level and for providing equal load sharing between each UPS in the plurality of UPS's while each UPS is operating in the bypass mode of operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
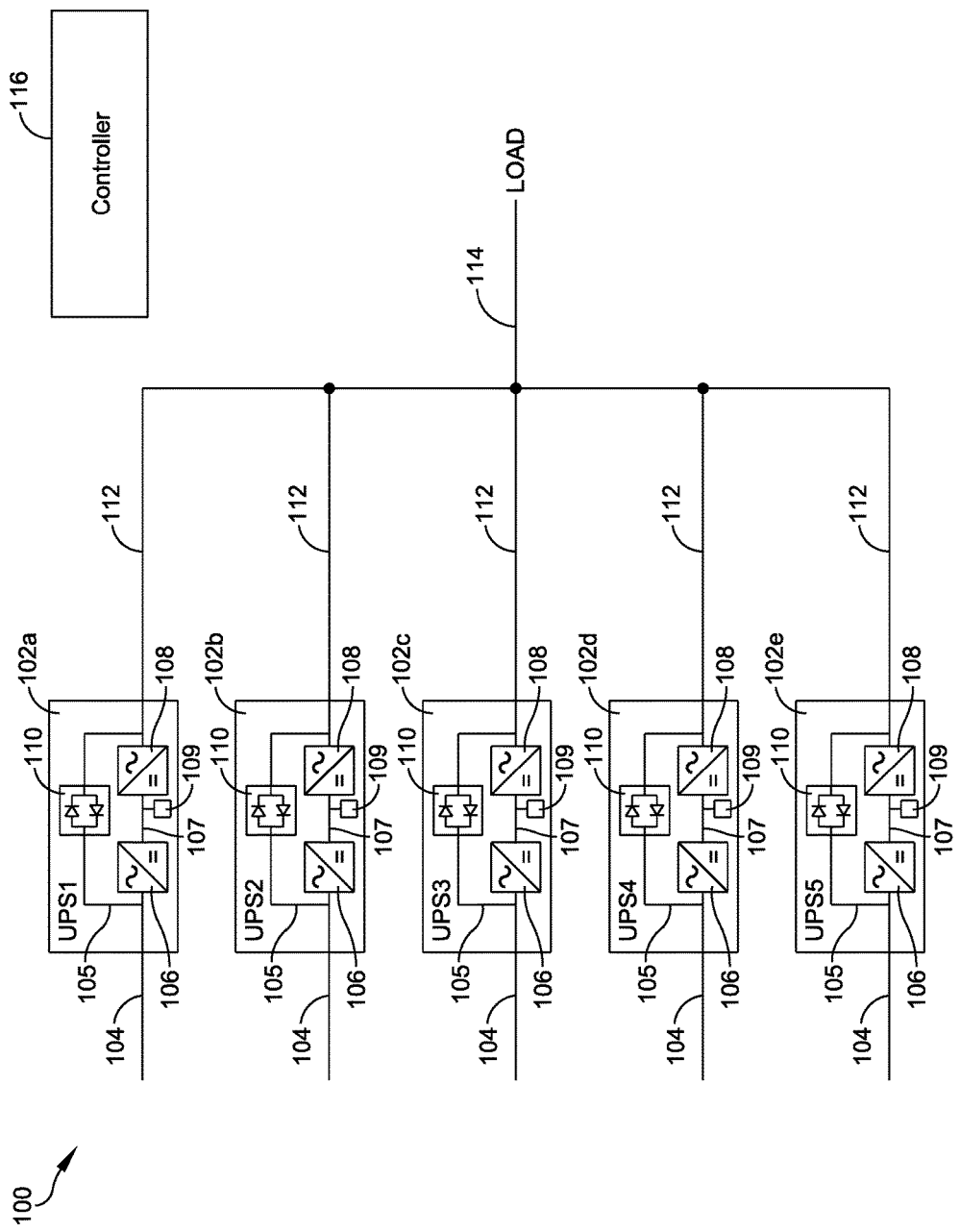
FIG. 1 is a block diagram illustrating a parallel UPS system according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, typical on-line UPS's may operate in a bypass mode where unconditioned power is provided through a bypass line directly from an AC power source (e.g., AC mains) to a load via a bypass switch. In the event of a disturbance at the AC mains (e.g., a sag or swell condition), the on-line UPS may enter an online mode or battery mode in which the bypass line is disconnected from the load by opening the bypass switch and the on-line UPS is operated to condition power provided by the AC mains or battery and provide the conditioned power to an output coupled to the load.

As also discussed above, two or more UPS's may be electrically connected to form a single parallel UPS system with one output. In such a parallel UPS system, successful (i.e., equal) load sharing between online UPS's coupled in parallel is achieved in the online or battery mode by operating the inverter of each online UPS to properly regulate the power provided by each online UPS to the single output (coupled to the load). However, successful load sharing between online UPS's coupled in parallel is much more difficult to achieve in bypass mode where unconditioned power is provided by each UPS to the single output. More specifically, even if similarly rated online UPS's are coupled together in parallel to a single output and are each providing power to the single output (i.e., the load) in bypass mode, manufacturing differences in components within each UPS and differences in the cables coupling each UPS to the single output may result in unequal load sharing between each UPS coupled in parallel.

If a load is unevenly shared between online UPS's coupled in parallel (and operating in bypass mode), one of the UPS's may become overloaded which may lead to damage in the components of the UPS. The uneven sharing of a load between online UPS's coupled in parallel may also result in an upstream protection circuit (e.g., a breaker) in one of the UPS's tripping, resulting in its share of the load being transferred to the other UPS's coupled in parallel. The additional load transferred to the other UPS's may result in the tripping of an upstream protection circuit in another one of the UPS's and the transferring of its load to the other UPS's coupled in parallel. As this breaker tripping/load transfer process continues to other UPS's, the remaining UPS's may eventually be unable to support the load and the load may be dropped.

A common technique for dealing with uneven load sharing between parallel UPS's operating in bypass mode is to identify the actual portion of the load supported by each UPS (i.e., the load sharing portion) coupled in parallel and to adjust the impedance between each UPS and the load in an attempt to evenly distribute the load across the UPS's. The impedance between each UPS and the load may be configured by adjusting the length of the cable coupling each UPS to the load and/or adding a choke (i.e., an inductor) between a UPS and the load. However, such techniques are typically difficult to implement, are expensive, and are inaccurate.

For example, it is generally accepted that despite adjusting the lengths of and/or adding chokes to the cables coupling parallel UPS's to a load, a maximum number of four online UPS's operating in bypass mode can be coupled together in parallel as coupling more than four online UPS's together in parallel will result in a load sharing portion deviation of more than 10% between the UPS's. Even with four parallel online UPS's operating in bypass mode, up to 10% deviation in the load sharing portion of each UPS can occur.

A system for providing equal load sharing between UPS's coupled in parallel and operating in bypass mode is provided herein. The system does not require the adjusting of cable lengths or the addition of expensive chokes and is capable providing equal load sharing between more than four UPS's coupled in parallel.

FIG. 1 is a block diagram of a parallel UPS system 100 according to aspects described herein. The parallel UPS system 100 includes five UPS's 102*a-e*. Each UPS 102*a-e* includes an input 104, a bypass line 105, an AC/DC converter 106, a DC bus 107, a DC/AC inverter 108, a bypass switch 110, and an output 112. The input 104 of each UPS 102*a-e* is coupled to an AC input power source (e.g., mains power). For each UPS 102*a-e*, the input 104 is also coupled to an input of the AC/DC converter 106 and the DC bus 107 is coupled between an output of the AC/DC converter 106 and an input of the DC/AC inverter 108. The UPS's 102*a-8* are coupled together in parallel such that the output 112 of each UPS 102*a-e* is coupled to the load 114. Within each UPS 102*a-e*, the bypass switch 110 is coupled between the input 104 and the output 112 via a bypass line 105. According to one embodiment, the bypass switch 110 in each UPS 102*a-e* includes two Silicon Controlled Rectifiers (SCR) (e.g., thyristors). In other embodiments, the bypass switch 110 may include another appropriate type of switch (e.g., a transistor). In some embodiments, the DC bus 107 is also coupled to a battery 109 via a DC/DC converter.

A controller 116 is coupled to each UPS 102*a-e* and is configured to monitor the input power provided to each UPS 102*a-e* by the input power source. Based on the presence and quality of the input power provided to each UPS 102*a-e* by the input power source, the controller 116 is configured to operate the UPS's 102*a-e* in different modes of operation.

In response to a determination that the AC power provided by the input power source is either lower than or greater than a desired level (e.g., is in a sag or swell condition), the controller 116 operates each UPS 102*a-e* to enter an "on-line" mode of operation. In the "on-line" mode of operation, the controller 116 operates a backfeed relay in each UPS 102a-e to close (thereby coupling the input power source to the input 104) and the bypass switch 110 of each UPS 102a-e to open. The AC/DC converter 106 of each UPS 102a-e receives AC power from the input power source and is operated by the controller 116 to convert the received AC power into DC power and provide the DC power to the DC-AC inverter 108 via the DC bus 107. The DC/AC inverter 108 of each UPS 102a-e is operated by the controller 116 to convert the received DC power into desired AC power and provide the desired AC power to the output 112.

Also in the "on-line" mode of operation, DC power on the DC bus 107 of each UPS 102a-e may be provided to a DC/DC converter coupled to the DC bus 107. The DC/DC converter converts the DC power received from the DC bus into DC power at a desired charging level and the DC power at the desired charging level is provided to a corresponding battery 109 to charge the battery 109.

In response to a determination that the AC power provided by the input power source has failed (e.g., is in a brownout or blackout condition), the controller 116 operates each UPS 102a-e to enter a "battery" mode of operation. In the "battery" mode of operation, the controller 116 operates a backfeed relay in each UPS 102a-e to open (thereby decoupling the input power source from the input 104) and the battery switch 110 of each UPS 102a-e to open. DC power from the battery 109 coupled to the DC bus 107 is provided to the DC/AC inverter 108 and the controller 116 operates the DC/AC inverter 108 to convert the received DC power into desired AC power, which is provided to the output 112.

In response to a determination that the AC power provided by the input power source is at a desired level, the controller 116 operates each UPS 102a-e to enter a "bypass" mode of operation. In the "bypass" mode of operation, the controller 116 operates a backfeed relay in each UPS 102a-e to close (thereby coupling the input power source to the input 104) and the bypass switch 110 of each UPS 102a-e to close. As such, in the "bypass" mode of operation, the input line 104 of each UPS 102a-e (coupled to the input power source) is coupled directly to the output line 112 of the corresponding UPS 102a-e via the bypass line 105. In the "bypass" mode of operation, AC power received at the input line 104 of each UPS 102a-e from the input power source is provided directly to the output 112.

Figure 2A:
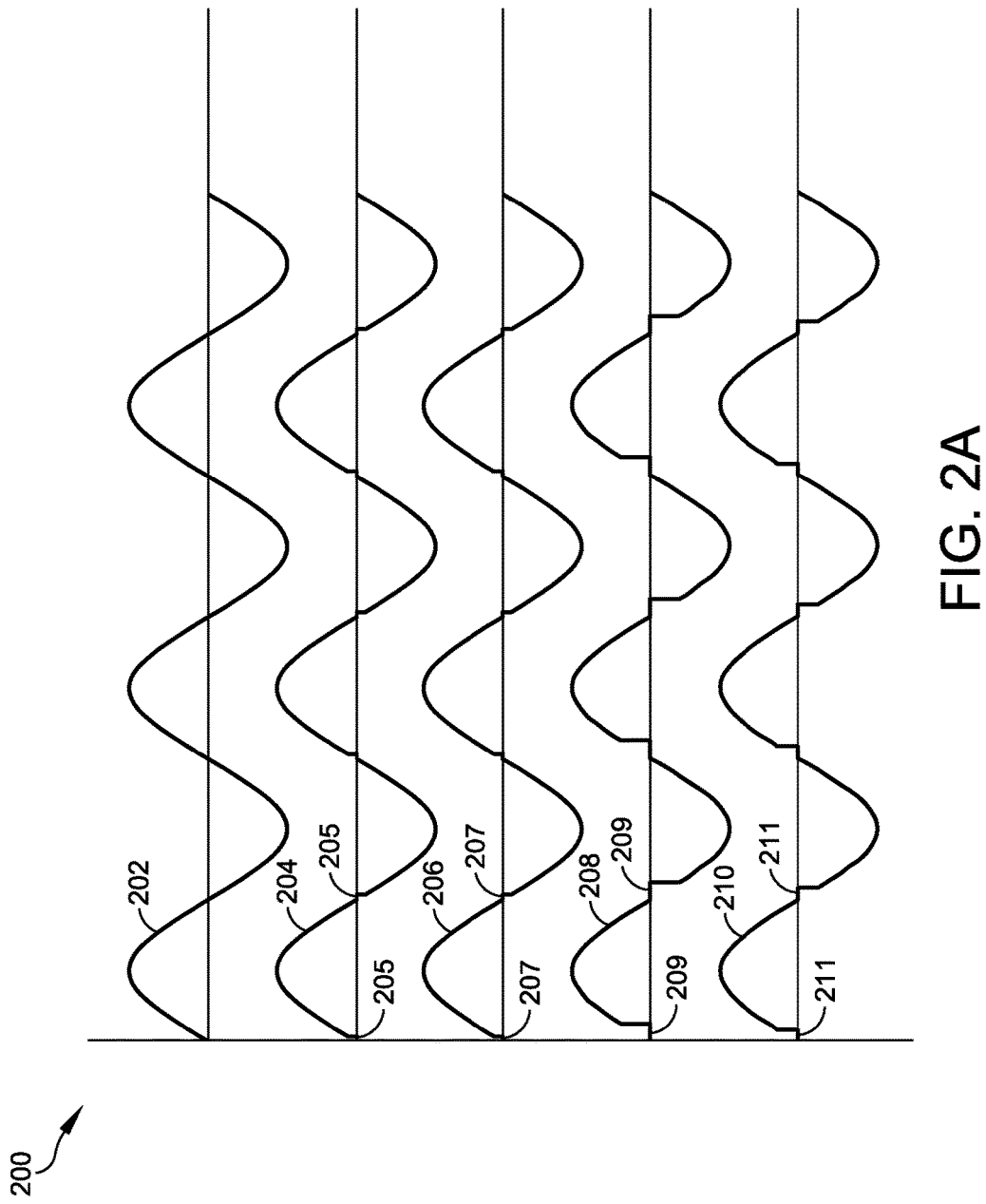
FIG. 2A is a graph illustrating current through the bypass switches of a parallel UPS system according to aspects of the current invention.
Figure 2B:
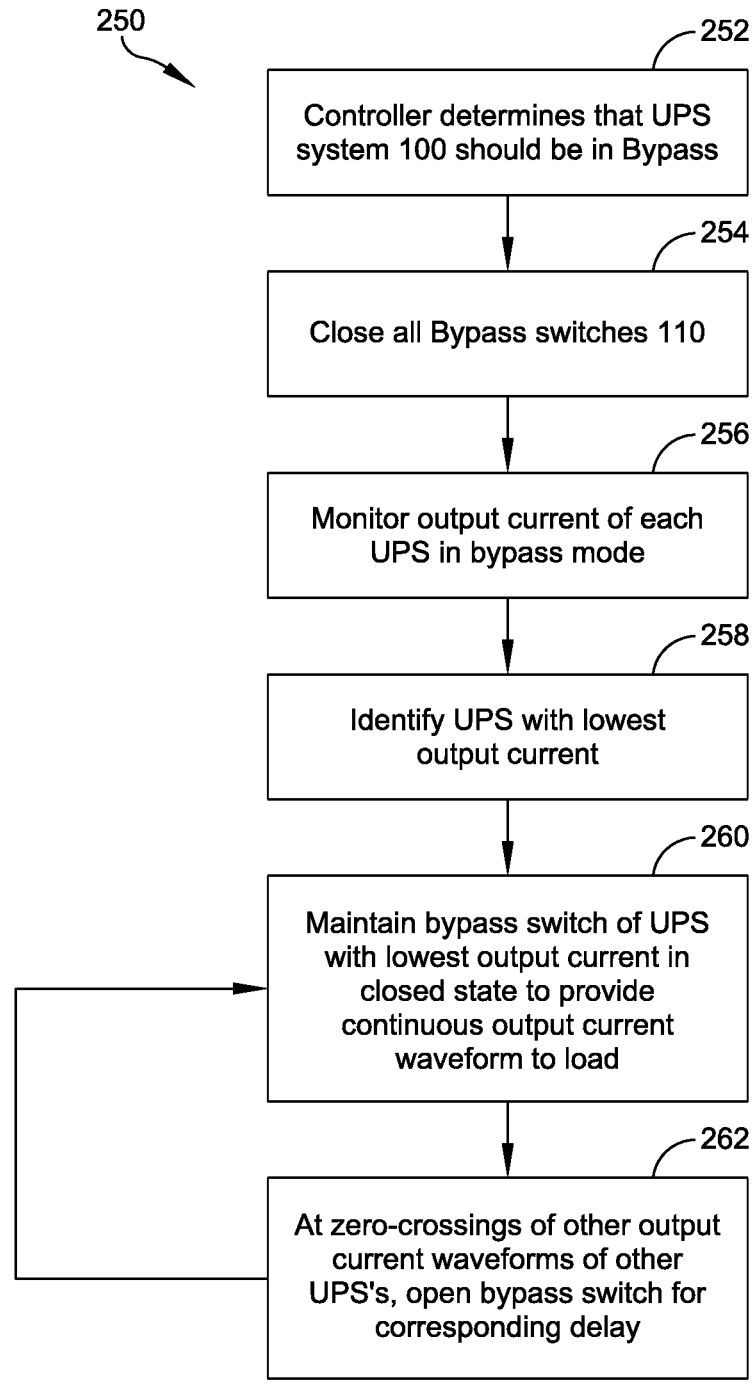
FIG. 2B is a process flow chart of the operation of a parallel UPS system according to aspects of the current invention.
Figure 3:
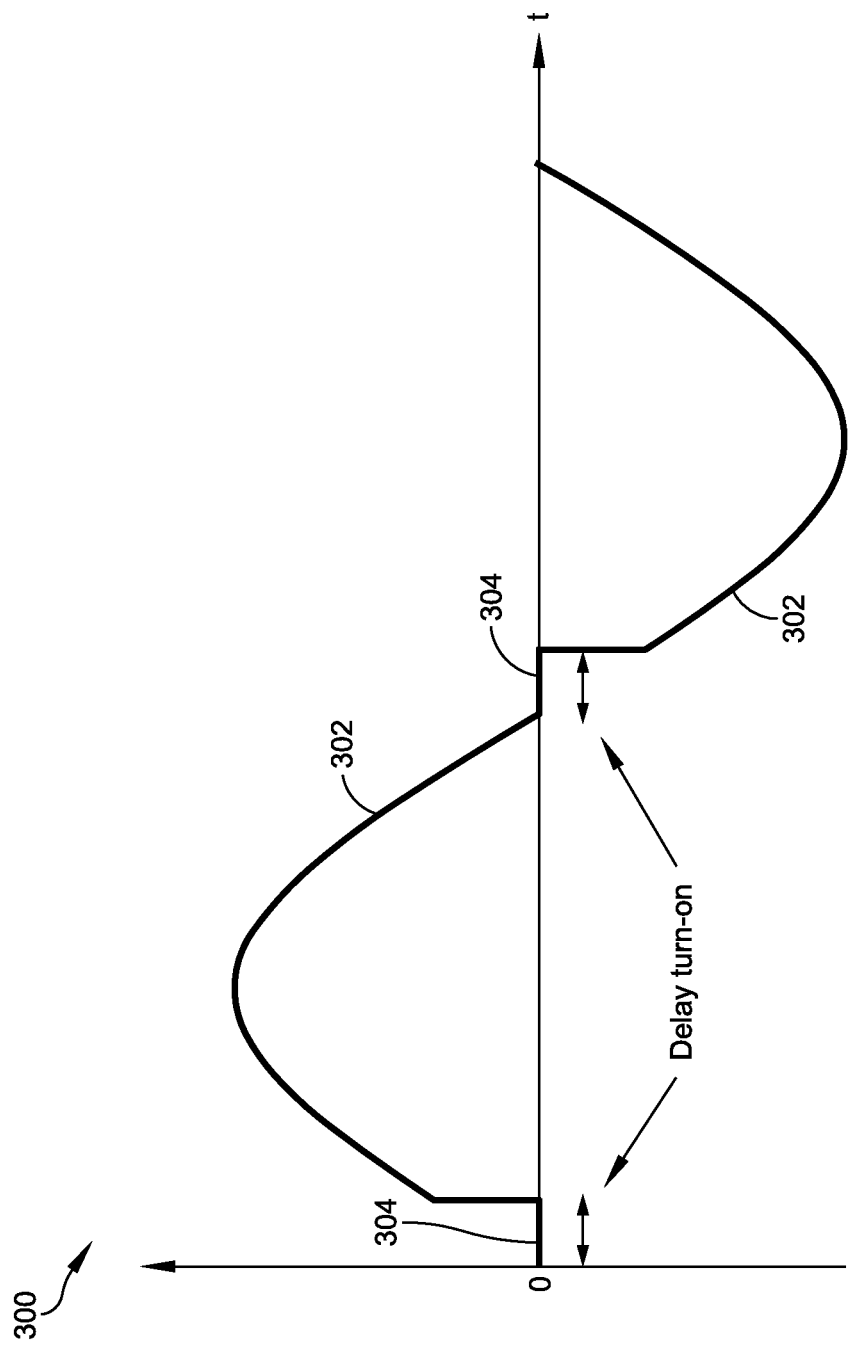
FIG. 3 is a graph illustrating current through a bypass switch of a UPS according to aspects of the current invention.

The switching of the UPS's into the "bypass" mode is discussed in greater detail below with respect to FIGS. 2A, 2B, and 3. FIG. 2A is a graph 200 illustrating the current through the bypass switch 110 of each UPS 102a-e in the "bypass" mode of operation. A first trace 202 represents the current through the bypass switch 110 of UPS1 102a, a second trace 204 represents the current through the bypass switch 110 of UPS2 102b, a third trace 206 represents the current through the bypass switch 110 of UPS3 102c, a fourth trace 208 represents the current through the bypass switch 110 of UPS4 102d, and a fifth trace 210 represents the current through the bypass switch 110 of UPS5 102e. FIG. 2B is a process flow chart illustrating one embodiment of the operation of the parallel UPS system 100 in "bypass" mode. FIG. 3 is a more detailed graph 300 illustrating the current 302 through a single exemplary bypass switch 110 of one of the UPS's 102a-e.

At block 252, the controller identifies that the UPS system 100 (i.e., each UPS 102a-e in the UPS system) should be operated in the "bypass" mode of operation (e.g., based on the input power received by each UPS 102a-e as discussed above). At block 254, in response to determining that each UPS 102a-e should be operated in the "bypass" mode of operation, the controller 116 operates the bypass switch 110 of each UPS 102a-e to close, thereby coupling the input 104 of each UPS 102a-e to its output 112. After the bypass switch 110 of each UPS 102a-e is closed, each UPS 102a-e provides unconditioned output power (provided directly from the input 104) to the load 114 via the bypass line 105. More specifically, once the bypass switch 110 of each UPS 102a-e is closed, each UPS 102a-e provides an output current having a current waveform (e.g., the output current waveforms 202, 204, 206, 208, 210 shown in FIG. 2A) to the load.

At block 256, the controller monitors the output current of each UPS 102a-e and, at block 258, the controller 116 identifies which UPS 102a-e has the lowest output current (i.e., the lowest Root Mean Square (RMS) value). According to one embodiment, the controller 116 identifies which UPS 102a-e has the lowest output current by comparing the output current of each UPS 102a-e with the output current of each other UPS 102a-e. In another embodiment, the controller 116 identifies which UPS 102a-e has the lowest output current by comparing the output current of each UPS 102a-e with an average of the output currents across all of the UPS's 102a-e. In other embodiments, the controller 116 may identify the UPS with the lowest output current in some other appropriate way.

Upon identifying the UPS 102a-e with the lowest output current (e.g., UPS1 102a), at block 260 the controller 116 operates the bypass switch 110 of UPS1 102a to be maintained continuously in a closed state (i.e., even at zero crossings of the output current waveform 202). As shown in FIG. 2A, the current 202 through the bypass switch 110 of UPS1 102a is a full sinusoidal waveform and the load 114 coupled to the output 112 of UPS1 102a continuously receives the full sinusoidal waveform 202 from UPS1 102a.

At block 262, the controller operates the bypass switch 110 of each remaining UPS 102b-e to introduce a delay into the output current waveform of each UPS 102b-e. For instance, according to at least one embodiment, the controller 106 operates the bypass switch 110 of each remaining UPS (i.e., UPS's 102b-e) to open for a corresponding delay period at the zero crossing of each output current waveform 202, 204, 206, 208, 210. For example, as shown in FIG. 2A, the controller 106 operates the bypass switch 110 of UPS2 102b to open for a first delay period 205 at the zero-crossings of the output current waveform 204, operates the bypass switch 110 of UPS3 102c to open for a second delay period 207 at the zero-crossings of the output current waveform 206, operates the bypass switch 110 of UPS4 102d to open for a third delay period 209 at the zero-crossings of the output current waveform 208, and operates the bypass switch 110 of UPS5 102e to open for a fourth delay period 211 at the zero-crossings of the output current waveform 210. In one embodiment, each delay period 205, 207, 209, 211 is set to a different value by the controller; however, in other embodiments, two or more of the delay periods 205, 207, 209, 211 may be set to the same value.

As shown in the exemplary embodiment of FIG. 3, the controller 116 operates the bypass switch 110 of the UPS's 102b-e (i.e., the UPS's that do not have the lowest output current) to open for a delay period 304 at the zero-crossings of the output current waveform 302. Once the bypass switch 110 is opened at the zero-crossings, current is prevented from passing through the bypass switch 110. After the delay period 304, the controller 106 again closes the bypass switch 110, current passes through the bypass switch 110, and the output current waveform 302 is provided to the load 114 from the corresponding UPS 102*b-e*. The opening of the bypass switch 110 for a delay period 304 continues at each zero-crossing. In one embodiment, the delay 304 is set to be ⅛$^{th}$ of a ½ period of the current waveform 302 (e.g., around 1 mS); however, in other embodiments, the delay 304 may be set as any other appropriate value. As discussed above, the delay 304 occurs at each zero-crossing of the waveform 302; however, in other embodiments, the delay 304 may occur at other portions of the waveform 302.

Referring back to FIG. 2A, at the zero-crossing of each output current waveform 202, 204, 206, 208, 210, only UPS1 102*a* is providing power to the load 114. However, as the controller 106 transfers load from UPS1 102*a* to each other UPS 102*b-e* (i.e., after the corresponding delay 205, 207, 209, 211 following the zero-crossing of the output current waveform 204, 206, 208, 210 of each UPS 102*b-e*), the load 114 is shared between the UPS's 102*a-e*. The controller 106 operates this "switching in" of the bypass line 105 of each UPS 102*b-e* in parallel with the bypass line 105 of UPS1 102*a* (after each zero-crossing) such that the power provided to the load 114 is evenly shared between the UPS's 102*a-e*.

More specifically, the controller 106 configures the delay period 205, 207, 209, 211 of each UPS 102*b-e* such that the Root Mean Square (RMS) value of the output current of each UPS 102*a-e* is substantially the same. By actively adjusting the delay period 205, 207, 209, 211 of each UPS 102*b-e*, the Root Mean Square (RMS) value of the output current of each UPS 102*a-e* can be configured substantially the same, despite potential differences in components and cabling within each UPS 102*a-e*. As the RMS value of the output current of each UPS 102*a-e* (i.e., the load sharing portion of each UPS) is set substantially the same, the deviation between load sharing portions of each UPS 102*a-e* is relatively low (e.g., around 0.1%) and eight or more UPS's can be successfully coupled together in parallel (i.e., with equal load sharing).

In addition, even though a delay period 205, 207, 209, 211 is introduced in the output current waveform 204, 206, 208, 210 of each UPS 102*b-e*, the load 114 continues to see a full output sinusoidal waveform from the system 100 as UPS1 102 provides a continuous sinusoidal waveform to the load 114. According to at least one embodiment, the controller 116 monitors the quality of the output waveform provided to the load 114. In one embodiment, in response to determining that the output waveform provided to the load 114 is not sinusoidal, the controller 116 removes, or at least reduces, at least one of the delays (e.g., delay 205, 207, 209, 211) in an output current waveform 202, 204, 206, 208, 210 of at least one of the UPS's 102*b-e* to provide a full sinusoidal output current waveform to the load 114.

By providing a full output current waveform to the load 114 via UPS1 102*a* and actively introducing a delay period into the output current waveform 204, 206, 208, 210 of each other UPS to control the RMS value of the output current of each UPS 102*a-e* to be substantially the same, equal load sharing between the UPS's 102*a-e* is provided and the overloading of the UPS's 102*a-e* can be prevented. In addition, power flow through the UPS's 102*b-e* can be reduced as each UPS 102*b-e* provides less than a full cycle of an output current waveform to the load 114. The reduced power flow through the UPS's 102*b-e* may result in a reduction in the amount of heat generated in each UPS 102*b-e* and the impact on the breakers within each UPS 102*b-e* may also be reduced.

According to one embodiment, the controller 116 is configured to analyze and update the load sharing between UPS's 102*a-e* each time the system 100 enters "bypass" mode. For example, in one embodiment, the controller 116 is configured to perform blocks 254-262 of FIG. 2B each time the system 100 enters "bypass" mode. In another embodiment, the controller 116 is configured to store the value of each delay period 205, 207, 209, 211 in memory and introduce the delay periods 205, 207, 209, 211 having the stored values in the corresponding output current waveforms 204, 206, 208, 210 when the system 100 subsequently re-enters bypass mode after operating in an "online" or "battery" mode.

In another embodiment, the controller 116 is configured to periodically analyze and update the delay values 205, 207, 209, 211 introduced in the waveforms 204, 206, 208, 210. For example, if the controller 116 identifies that load sharing is not being performed equally, the controller 116 adjusts at least one delay value of at least one UPS 102*a-e* to equalize the load sharing. According to one embodiment, each time the controller 116 defines the values of the delays 205, 207, 209, 211, the individual delay value for each UPS is stored locally within each corresponding UPS 102*a-e* such that the UPS 102*a-e* can operate with the appropriate delay even if communication with the controller 116 fails. In one embodiment, the delay value is stored in a local memory module. In another embodiment, the delay value is stored in a local bypass controller that is configured to operate the corresponding bypass switch 110 to close after the stored delay value has passed.

As described above, a single main controller 116 is utilized to control the operation of each UPS 102*a-e*; however, in other embodiments, more than one controller can be utilized to control the operation of each UPS 102*a-e*. For example, in one embodiment, each UPS 102*a-e* includes its own individual bypass controller. Each individual controller is configured to monitor parameter information (e.g., input power, output power, status, etc.) of its corresponding UPS and transmit corresponding information to the main controller 116. In one embodiment, each bypass controller transmits its monitored parameter information to the main controller 116 via a serial bus; however, in other embodiments, the bypass controllers and the main controller 116 can communicate via another appropriate system. The main controller 116 receives the information from each bypass controller and determines the delay value for each UPS based on the received information. As discussed above, the main controller 116 can then transmit a corresponding delay value to each bypass controller via the serial bus. In one embodiment, the main controller can be the controller of one of the UPS devices functioning as a master UPS device of the overall system.

Figure 4:
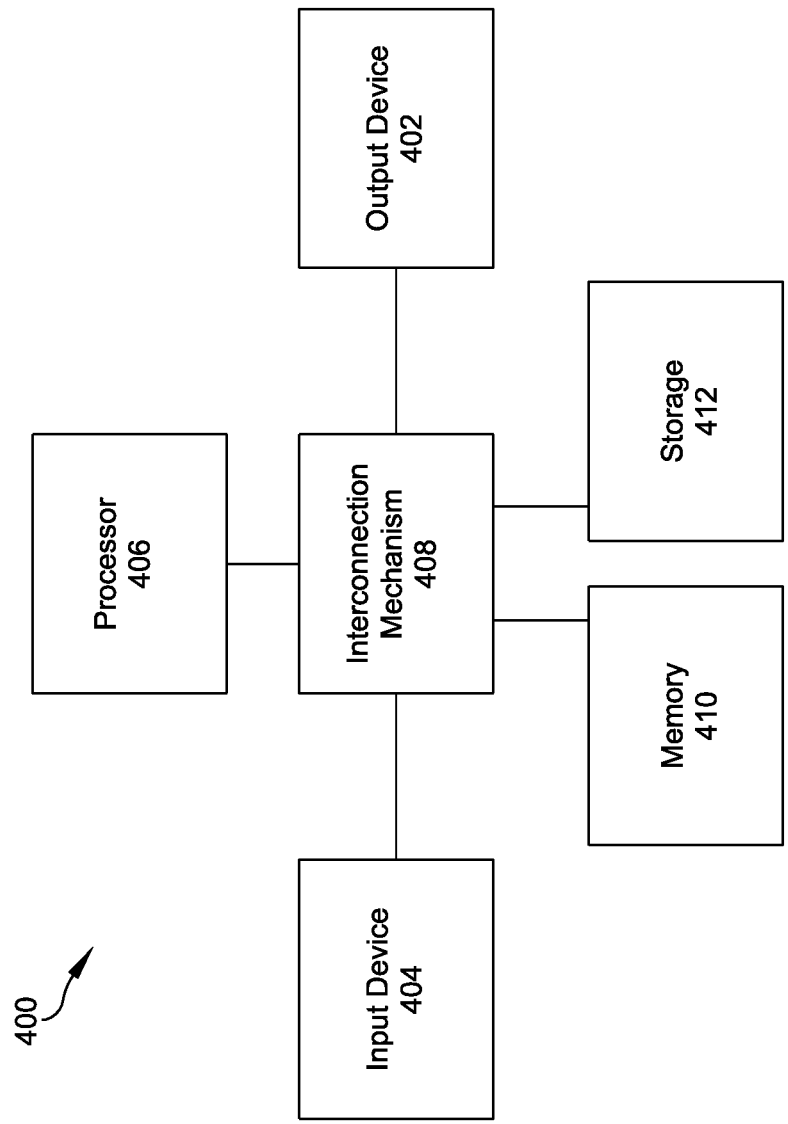
FIG. 4 is a block diagram of a system upon which various embodiments of the invention may be implemented.

FIG. 4 illustrates an example block diagram of computing components forming a system 400 which may be configured to implement one or more aspects disclosed herein. For example, the system 400 may be communicatively coupled to the controller 116, included within the controller 116, or included within a bypass controller. The system 400 may also be configured operate UPS's in parallel as discussed above.

The system 400 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 4.

The system 400 may include a processor/ASIC 406 connected to one or more memory devices 410, such as a disk drive, memory, flash memory or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the parallel UPS system 100 includes five UPS's; however, in other embodiments, any other appropriate number of UPS's may be coupled together in parallel.

As also described above, the bypass switch 110 of UPS1 102a is continuously operated in a closed state; however, in other embodiments, any other one of the UPS's can be identified as having the lowest output current and as a result, have its bypass switch continuously operated in a closed state. Accordingly, the bypass switch 110 of UPS1 102 could also be operated to introduce a delay at the zero-crossing of the output current waveform of UPS1 102a. As described above, the UPS with the lowest output current is operated to provide a continuous output current waveform to a load; however, in other embodiments, a different UPS may be operated to provide the continuous output current waveform to the load.

As described above, the system and method for providing equal load sharing is utilized with a parallel UPS system including online UPS's; however, in other embodiments, the system and method described herein can be utilized with other types of UPS's or power systems, coupled in parallel, to provide equal load sharing with unregulated power outputs.

As discussed above, a system for providing equal load sharing between UPS's coupled in parallel and operating in bypass mode is provided herein. The system does not require the adjusting of cable lengths or the addition of expensive chokes and is capable of including more than four UPS's coupled in parallel. By providing a full output current waveform to a load via UPS operating continuously in bypass mode and actively introducing a delay period into the output current waveform of each other UPS coupled in parallel to control the RMS value of the output current of each UPS to be substantially the same, equal load sharing between the UPS's can be provided despite potential differences in components and cabling within each UPS. As the output current of each UPS (i.e., the load sharing portion of each UPS) is set substantially the same, the deviation between load sharing portions of each UPS is relatively low (e.g., around 0.1%) and more than four UPS's can be successfully coupled together in parallel while reducing many of the risks associated with performing load sharing between bypass mode operating UPS's coupled in parallel.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system comprising:
   a plurality of Uninterruptible Power Supplies (UPS) configured to be coupled in parallel, each UPS comprising:
   an input configured to be coupled to a power source and to receive input power;
   an output configured to be coupled to a load and to provide output power to the load derived from at least the input power; and a bypass line selectively coupled between the input and the output via a bypass switch, wherein the bypass switch is configured to close in a first mode of operation, coupling the input of the UPS to the output of the UPS via the bypass line, and to open in a second mode of operation, decoupling the input of the UPS from the output of the UPS; and a controller coupled to the plurality of UPS's and configured to:
monitor the input power received at the input of each UPS;
in response to a determination that the input power is at a desired level, control the bypass switch of a first UPS in the plurality of UPS's to operate in the first mode of operation and provide a continuous first output current waveform with a Root Mean Square (RMS) value to the load; and
in response to the determination that the input power is at the desired level, control the bypass switch of a second UPS in the plurality of UPS's to close in the first mode of operation such that a second output current waveform is provided by the second UPS to the load via the bypass line of the second UPS, and control the bypass switch of the second UPS to open in the second mode of operation such that the second output current waveform provided to the load includes at least one first delay period compared to the continuous first output current waveform provided to the load via the bypass line of the first UPS.

2. The UPS system of claim 1, wherein in controlling the bypass switch of the second UPS in the plurality of UPS's to operate in the first mode of operation, the controller is further configured to control the bypass switch of the second UPS in the plurality of UPS's to close in the first mode of operation such that the second output current waveform provided by the second UPS to the load has an RMS value substantially the same as the RMS value of the continuous first output current waveform.

3. The UPS system of claim 2, wherein the controller is further configured to:
control the bypass switch of a third UPS in the plurality of UPS's to operate in the first mode of operation such that a third output current waveform is provided to the load, the third output current waveform including at least one second delay period compared to the continuous first output current waveform provided to the load via the bypass line of the first UPS and having an RMS value substantially the same as the RMS value of the continuous first output current waveform.

4. The UPS system of claim 3, wherein the bypass switch within each UPS includes a Silicon Controlled Rectifier (SCR).

5. The UPS system of claim 3, wherein the system is configured such that the RMS value of the continuous first output current waveform, the RMS value of the second output current waveform, and the RMS value of the third output current waveform differ by less than 0.1%.

6. The UPS system of claim 3, wherein the controller is further configured to control the bypass switch of the second UPS such that the at least one first delay period occurs in the second output current waveform at each zero crossing of the second output current waveform; and
wherein the controller is further configured to control the bypass switch of the third UPS such that the at least one second delay period occurs in the third output current waveform at each zero crossing of the third output current waveform.

7. The UPS system of claim 3, wherein the controller is further configured to:
monitor a quality of the continuous first output current waveform; and
in response to determining that the continuous first output current waveform is not sinusoidal, reduce a value of the at least one first delay period.

8. The UPS system of claim 3, wherein the controller is further configured to update a value of the at least one first delay period and a value of the at least one second delay period each time the controller controls the first UPS to operate in the first mode of operation.

9. The UPS system of claim 3, wherein the controller is further configured to periodically update a value of the at least one first delay period and a value of the at least one second delay period.

10. The UPS system of claim 1, wherein each UPS in the plurality of UPS's further comprises:
an AC/DC converter coupled to the input and configured to convert the input power into DC power; and
a DC bus coupled to the AC/DC converter and configured to receive the DC power; and a DC/AC inverter coupled to the DC bus,
wherein in response to a determination that the input power is above or below the desired level, the controller is further configured to control the bypass switch of each UPS in the plurality of UPS's to operate in the second mode of operation and to operate the DC/AC inverter of each UPS to convert the DC power on the DC bus into the output power.

11. The UPS of claim 10, wherein each UPS in the plurality of UPS's further comprises a battery coupled to the DC bus and configured to provide battery power to the DC bus, wherein in response to a determination that the input power has failed, the controller is further configured to control the bypass switch of each UPS in the plurality of UPS's to operate in the second mode of operation and to operate the DC/AC inverter of each UPS to convert the battery power on the DC bus into the output power.

12. The UPS system of claim 1, wherein, in response to the determination that the input power is at the desired level, the controller is further configured to:
control the bypass switch of the first UPS in the plurality of UPS's to operate in the first mode of operation such that the first UPS in the plurality of UPS's provides a continuous fourth output current waveform having an RMS value to the load;
control the bypass switch of the second UPS in the plurality of UPS's to operate in the first mode of operation such that the second UPS in the plurality of UPS's provides a continuous fifth output current waveform having an RMS value to the load;
monitor the continuous fourth output current waveform of the first UPS in the plurality of UPS's;
monitor the continuous fifth output current waveform of the second UPS in the plurality of UPS's; and
identify the first UPS of the plurality of UPS's based on a determination that the RMS value of the continuous fourth output current waveform is lower than the RMS value of the continuous fifth output current waveform.

13. The UPS system of claim 1, wherein during the at least one first delay period, the second output current waveform provided to the load via the bypass line is forced to zero.

14. A method for operating a UPS system including a plurality of UPS's coupled in parallel, each UPS comprising an input configured to receive input power, an output configured to provide output power to a load, and a bypass line selectively coupled between the input and the output via a bypass switch, the method comprising:

monitoring the input power received at the input of each UPS;

in response to a determination that the input power is at a desired level, controlling, in a bypass mode of operation, the bypass switch of a first UPS in the plurality of UPS's to couple the input of the first UPS to the output of the first UPS via the bypass line such that the first UPS provides a continuous first output current waveform with an RMS value to the load; and in response to the determination that the input power is at the desired level, controlling, for a second UPS in the plurality of UPS's, the bypass switch to couple the input to the output via the bypass line such that a second output current waveform is provided by the second UPS to the load via the bypass line, and controlling, for the second UPS, the bypass switch to open in the second mode of operation such that the second output current waveform provided to the load includes at least one first delay period compared to the continuous first output current waveform provided to the load via the bypass line of the first UPS.

15. The method of claim 14, wherein controlling, for the second UPS in the plurality of UPS's, the bypass switch to couple the input to the output via the bypass line, includes controlling, for the second UPS in the plurality of UPS's, the bypass switch to couple the input to the output via the bypass line such that the second output current waveform provided by the second UPS to the load has an RMS value substantially the same as the RMS value of the continuous first output current waveform.

16. The method of claim 15, wherein further comprising:
in response to the determination that the input power is at the desired level, controlling the bypass switch of a third UPS in the plurality of UPS's to couple the input to the output such that a third output current waveform is provided to the load, the third output current waveform including at least one second delay period compared to the continuous first output current waveform provided to the load via the bypass line of the first UPS and having an RMS value substantially the same as the RMS value of the continuous first output current waveform.

17. The method of claim 16, wherein controlling the bypass switch of the second UPS includes controlling the bypass switch of the second UPS such that the at least one first delay period occurs in the second output current waveform at each zero crossing of the second output current waveform; and wherein controlling the bypass switch of the third UPS includes controlling the bypass switch of the third UPS such that the at least one second delay period occurs in the-third output current waveform at each zero crossing of the third output current waveform.

18. The method of claim 16, further comprising:
monitoring a quality of the continuous first output current waveform; and
in response to determining that the continuous first output current waveform is not sinusoidal, reducing a value of the at least one first delay period.

19. The method of claim 16, further comprising at least one of updating the at least one first delay period and the at least one second delay period each time the bypass switch of the first UPS is operated in the bypass mode, and periodically updating the at least one first delay period and the at least one second delay period.

20. The method of claim 14, further comprising:
in response to the determination that the input power is at the desired level, controlling the bypass switch of the first UPS in the plurality of UPS's to operate in the first mode of operation such that the first UPS in the plurality of UPS's provides a continuous fourth output current waveform having an RMS value to the load;
in response to the determination that the input power is at the desired level, controlling the bypass switch of the second UPS in the plurality of UPS's to operate in the first mode of operation such that the second UPS in the plurality of UPS's provides a continuous fifth output current waveform having an RMS value to the load;
monitoring the continuous fourth output current waveform of the first UPS in the plurality of UPS's;
monitoring the continuous fifth output current waveform of the second UPS in the plurality of UPS's; and
identifying the first UPS of the plurality of UPS's based on a determination that the RMS value of the continuous fourth output current waveform is lower than the RMS value of the continuous fifth output current waveform.

21. The method of claim 14, wherein controlling, for the second UPS, the bypass switch to open in the second mode of operation includes forcing the second output current waveform to zero.

* * * * *